United States Patent [19]
Bell

[11] Patent Number: 5,921,571
[45] Date of Patent: Jul. 13, 1999

[54] FOLDING FRAME FOR A VEHICLE OR TRAILER

[76] Inventor: Robert Bell, 86 Arthur St. North, Guelph, Ontario, Canada, N1H 2M3

[21] Appl. No.: 09/071,422

[22] Filed: May 1, 1998

[51] Int. Cl.[6] ....................................................... B62B 3/02
[52] U.S. Cl. ........................................... 280/204; 280/657
[58] Field of Search ................................. 280/204, 645, 280/651, 652, 656, 657, 658, 47.18, 47.24, 47.25, 63

[56] References Cited

U.S. PATENT DOCUMENTS

| | | |
|---|---|---|
| D. 340,429 | 10/1993 | Smith . |
| D. 351,575 | 10/1994 | Fenton et al. . |
| 3,792,875 | 2/1974 | Paden . |
| 4,077,646 | 3/1978 | Watkins . |
| 4,256,321 | 3/1981 | Trulove . |
| 4,381,117 | 4/1983 | French et al. . |
| 4,721,320 | 1/1988 | Creps et al. . |
| 5,020,813 | 6/1991 | Gottschalk . |
| 5,020,814 | 6/1991 | George et al. . |
| 5,267,744 | 12/1993 | Berry et al. . |
| 5,267,788 | 12/1993 | Rockstedt . |
| 5,308,096 | 5/1994 | Smith . |
| 5,313,817 | 5/1994 | Meinders . |
| 5,344,171 | 9/1994 | Garforth-Bles . |

FOREIGN PATENT DOCUMENTS

| | | |
|---|---|---|
| 4227632 | 2/1994 | Germany . |

OTHER PUBLICATIONS

American Bicyclist & Motorcyclist, May 1993, p. 56, Utility Trailer, Circle No. 178.
American Bicyclist & Motorcyclist, Mar. 1993, p. 46, the Cycletote, Circle No. 131.
American Bicyclist & Motorcyclist, Dec. 1991, p. 18, IMS Trailer Jogs and Strolls, Circle No. 179.
Advertisement by Kiddie Kart Bicycle Trailers, Inc. for a "New Folding Kiddie Kruiser" (undated).
Advertisement by Chariot Carriers Inc. for a "Cabriolet"bicycle trailer (undated).
Advertisement by Blue Sky Cycle Carts for a Blue Sky Cycle Cart (undated).
Brochure of Tri Industries, Inc. for an Aerocruiser bike trailer and stroller and Huffy Town–n–Stroll (undated).
Advertisement for Burley–Roo bicycle trailer (undated).
Advertisement of Outilage de Precision Drummond Inc. for the Orby bicycle trailer (undated).
Advertisement of Kiddie Kart International for Kiddie Kart bicycle trailer (undated).
Advertisement of S. Winchester's Originals, Inc. for The Runner Kit (undated).
Copy of advertisement of Winchester bicycle trailer (undated).

*Primary Examiner*—Kevin Hurley
*Assistant Examiner*—William R. Zimmerli
*Attorney, Agent, or Firm*—Wall Marjama Bilinski & Burr

[57] ABSTRACT

A foldable frame and body for a vehicle or trailer provides a chassis, at least one frame member pivotally mounted to the chassis at a first pivot point, a hinge arm pivotally mounted to the chassis at a second pivot point and a release arm for closing the frame which is pivotally connected to the frame member at a third pivot point and to the hinge arm at a fourth pivot point such that the fourth pivot point moves toward a line between the second and third pivot points as the frame is unfolded, leveraging the frame to an open position. The foldable vehicle or trailer is lightweight and may be motorized or human-powered.

20 Claims, 8 Drawing Sheets

FOLDING FRAME FOR A VEHICLE OR TRAILER

FIELD OF THE INVENTION

The present invention relates to a foldable frame for a covered trailer or moving vehicle and to a mechanism for opening and closing the foldable frame. This invention further relates to a trailer or moving vehicle embodying the folding frame. The vehicle may either run independently as a motorized or human-powered vehicle or as a trailer to be towed behind another vehicle such as a bicycle.

BACKGROUND OF THE INVENTION

Trailers for use with bicycles are known in the art. Such trailers can be used for carrying small children and other belongings. It is important that the trailer be easy to open and close and that it fold in a compact way so that it can be readily stored or moved in the trunk or confines of another vehicle, such as a car.

A simple mechanism to erect and collapse the trailer or vehicle is essential for ease of use by the consumer and also for minimizing manufacturing costs (thereby reducing the ultimate cost to the consumer). It is important that the trailer be collapsible in as simple a fashion as possible and erected in as simple a fashion as possible in order to facilitate the ready use of the trailer or vehicle by users. This should not be a time consuming or complex procedure.

In addition, there is a recognized need for a small moving vehicle which is also collapsible or folding yet moves under its own power, for example, as a motorized vehicle or human-power vehicle. A lightweight vehicle could be used as a personal commuting vehicle.

Finally, there is an advantage to having a towable trailer with a tow arm which is movable from a first position to a second position whereby you can chose either to push the trailer or tow the trailer depending on the position of the bar.

SUMMARY OF THE INVENTION

It is an aspect of the present invention to provide a folding frame designed for either a trailer or a moving vehicle which is easy to manufacture, readily foldable or collapsible and has minimum manufacturing complexity.

According to an aspect of the present invention, there is provided a folding frame for a trailer or a moving vehicle comprising
  a) a chassis,
  b) at least one frame member pivotally mounted to said chassis at a first pivot point adjacent to its rear end,
  c) a hinge arm pivotally mounted to said chassis at a second pivot point spaced from said first pivot point along said chassis, and
  d) a release arm pivotally mounted to said at least one frame member at a third pivot point and pivotally mounted to said hinge arm at a fourth pivot point, wherein when the fourth pivot point passes a line defined between said second pivot point and said third pivot point a leverage provided by said release arm increases as the frame approaches a fully open condition.

According to another aspect of the present invention, the frame further comprises a rear frame member and a medial frame member.

According to another aspect of the present invention, said release arm and said medial frame member are not connected together such that said medial frame member is free to move around said first pivot point at which said rear frame member, said medial frame member and said chassis are together pivotally connected.

According to another aspect of the present invention, the frame is provided with a pliant fabric surrounding said rear frame member, said medial frame member and said chassis thereby forming a body portion and when in said open position said medial frame member is kept in the open position by the pliant fabric.

According to another aspect of the present invention, the chassis further comprises a lower frame member extending below said chassis which when covered by said fabric forms a well below said chassis.

According to another aspect of the present invention, said body portion is mounted on an axle with wheels.

According to another aspect of the present invention, the frame further comprises a tow-bar.

According to another aspect of the present invention, the tow-bar is pivotally connected proximate to said axle.

According to another aspect of the present invention, the tow-bar can be pivoted between an upper position and a lower position such that when in said upper position the vehicle can be pushed and when in said lower position the vehicle can be towed or pulled.

According to another aspect of the present invention, the tow-bar is secured in either said upper position or in said lower position.

According to another aspect of the present invention, the rotation of the tow-bar is limited in said upper position by a catchment.

According to another aspect of the present invention, the rotation of the tow-bar is secured in said lower position by a catchment.

According to another aspect of the present invention, the body is mounted on at least three wheels such that at least one wheel is position at the front of the vehicle and the other two wheels are secured to said axle at the rear of said vehicle.

According to another aspect of the present invention, the frame further comprises a motor to drive said axle.

According to another aspect of the present invention, said rear frame member, said medial frame member and said chassis are hoops, said hoops having a first end and a second end, said hoops being pivotally mounted at said first pivot point proximate said first ends and said hoops being pivotally mounted to said axle at said second ends.

According to another aspect of the present invention, said chassis is permanently mounted on said axle and said rear frame member and said medial frame member are free to pivot at said first pivot point.

According to another aspect of the present invention, said release arm extends behind said rear frame member and said release arm having a first handle end and a second distal end is pivotally connected to said rear frame member at a second pivot point on said rear frame member at said distal end of said release arm.

According to another aspect of the present invention, said release arm is external to said fabric.

According to another aspect of the present invention, the portion of said release arm extending behind said rear frame member further comprises a support frame for a sac for carrying goods.

BRIEF DESCRIPTION OF THE DRAWINGS

The present invention will be described in greater detail with reference to the accompanying drawings, in which like numerals refer to like parts and in which different embodiments of the same parts are indicated by the same reference numeral with a prime.

FIG. 2a illustrates the relative positions of the frame members and pivots when in the partially open position. FIG. 2b illustrates the positions of the frame members and pivots when in a partially folded position.

FIG. 3a illustrates the basic frame components in the open position. FIG. 3b illustrates the basic frame components in the folded position

Figure 1:
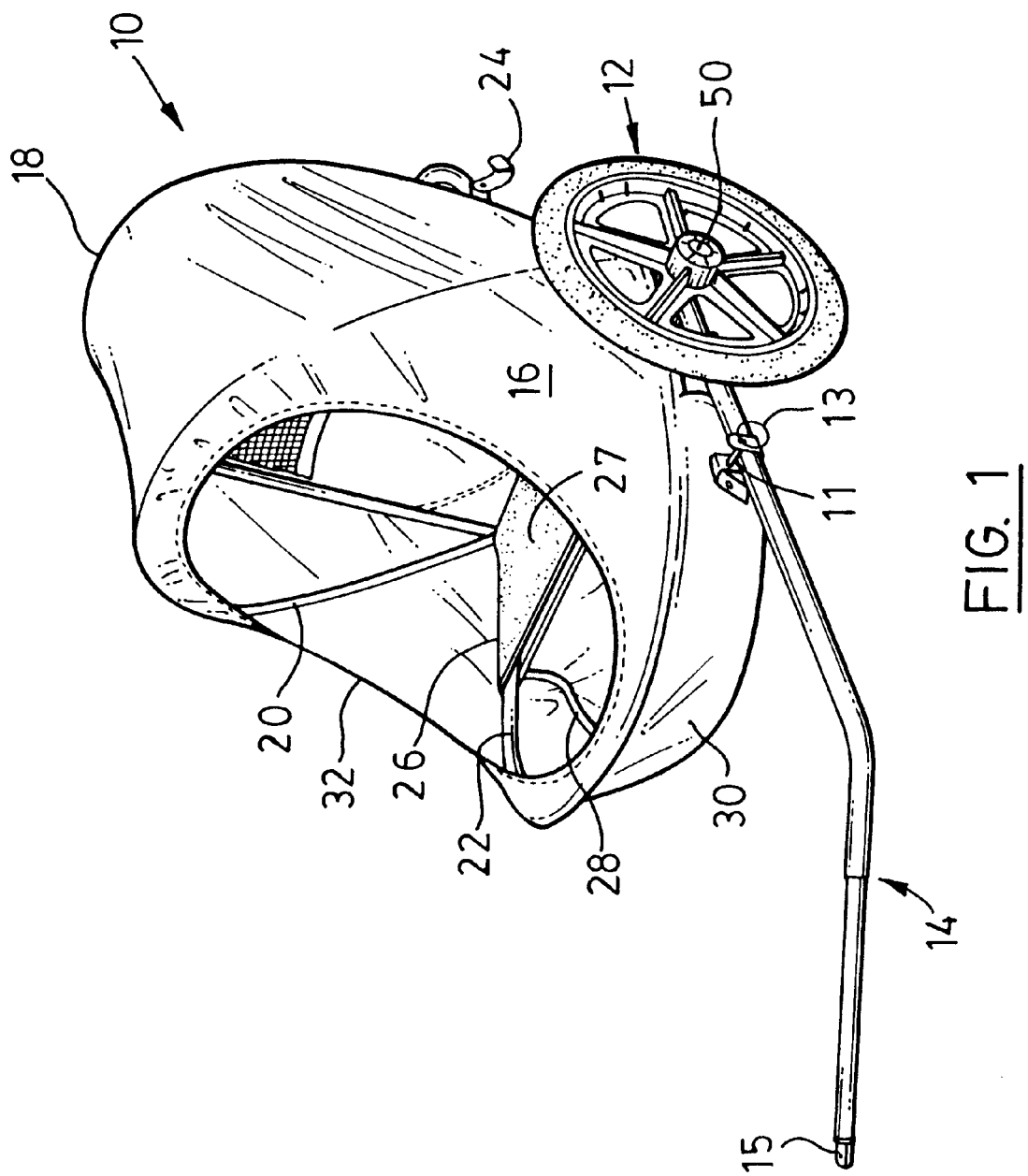
FIG. 1 is a side perspective drawing of a foldable trailer of the present invention illustrating the trailer vehicle from the tow-bar side of the vehicle.

In the drawings, preferred embodiments of the invention are illustrated by way of example. Other further advantages and features of the invention will be apparent to those skilled in the art from the following detailed description thereof and the accompanying drawings.

It is expressly understood that the description and drawings are illustrative of certain embodiments of the invention, but the invention itself is defined by the accompanying claims.

DETAILED DESCRIPTION OF THE PREFERRED EMBODIMENTS

The present invention relates to a foldable frame and to a mechanism for opening and folding the foldable frame. The invention further relates to the foldable frame of the present invention when covered by a pliant or flexible fabric thereby providing a foldable body for the small vehicle or trailer. The body can be mounted on wheels for moving it either by way of towing or other propulsion means. It may or may not further comprise steering means.

One use for the foldable frame of the present invention is as a trailer for towing behind a person or another vehicle, such as a bicycle. Alternatively, the frame can be used for a vehicle to be pushed as a stroller or pulled by hand. In yet another embodiment the frame could be mounted on wheels at front and back and then motorized. In yet another embodiment the frame could be mounted on skis.

Turning to the drawings, FIG. 1 illustrates a trailer embodiment of the foldable frame of the present invention. In FIG. 1 the rear portion of the vehicle body 10 is mounted on an axle (not shown) which is connected to wheels on either side of the vehicle body. In FIG. 1 the rear portion of the vehicle body 10 is mounted on an axle 50 (shown in FIGS. 4 and 5 which is connected to wheels 12 on either side of the vehicle body. In this embodiment the vehicle body 10 is mounted on wheels 12 having a tow-bar 14 for attachment near the rear wheel of a bicycle (not shown). In FIG. 1 the frame for the vehicle body is covered by a pliant fabric 16. The frame is only partially visible underneath the fabric 16 and in this particular embodiment the frame comprises three basic frame members: a rear frame 18, a medial frame 20 and a chassis 22.

In the embodiment illustrated in FIG. 1 the three basic frame members 18, 20 and 22 are substantially hoop shaped. Other shapes would be possible and would be known to a person skilled in the art. A distinct advantage of the rounded shape provided by the hoops is that they create an aerodynamic shape for the vehicle/trailer which minimizes drag. They also prevent the accumulation of water on the top of the vehicle.

FIG. 1 depicts one embodiment of the present invention which is suited for towing behind another vehicle, such as a bicycle, or to be pulled. The tow-bar 14 is illustrated in its lower position extending from the axle 50 substantially parallel to the frame chassis 22. The tow-bar 14 is secured in this lower position. In the embodiment illustrated in FIG. 1 the tow-bar is secured by a pin and ring mechanism 13. Other equivalent mechanisms for securing the tow-bar to the vehicle body would be known to a person skilled in the art. The tow-bar 14 should be secured in one position so that it does not move up or down when connected to the bicycle, or other vehicle, which is towing it.

In the particular embodiment illustrated in FIG. 1 the tow-bar 14 has an attachment point 15 for attaching near the rear axle of a bicycle.

The tow-bar 14 can be released from its securement at chassis 22 in catchment 11 and pivoted around the axle 50 thereby raising it to an upright position (not shown) and come to rest in catchment 24. The tow-bar 14 may be secured by a locking mechanism in the catchment (not shown). For facility pushing the vehicle, the tow-bar 14 may be angled at the end distal from the axle so that it serves as a handle 14a when in the upright position and can be pushed akin to a stroller from the rear of the vehicle/trailer.

The body of the vehicle, as illustrated in FIG. 1, may have a seat portion 26 mounted, for example, on the chassis 22. The seat portion 26 may be made of fabric 27 stretched from one side of the chassis 22 to the other side of the chassis 22 (illustrated partially in FIG. 1). Other variations and equivalents such as a board mounted on the chassis or a separate chair mounted within the vehicle body 10 and secured to at least one of the frame members are contemplated as within the scope of the present invention. Other equivalent seating means and arrangements would be well understood to a person skilled in the art.

Extending below the chassis 22 an additional lower frame member 28 may be secured to provide a footwell 30 within the vehicle body 10. In FIG. 1 the lower frame member 28 extends down from the chassis 22 and curves towards the front of the vehicle body 10. The fabric 16 when stretched around the lower frame member 28 thereby forms a footwell 30 which is lower than the seat 26 so that when someone sits on the seat they have a comfortable place in which to put their feet and allows them to sit in a normal seated position.

As illustrated in FIG. 1, the vehicle body 10 has an opening 32. The opening 32 may be left open, covered by a net or mesh, covered by a fabric door or covered by clear plastic. The opening 32 allows the occupant to enter the vehicle body easily and also may provide a clear view of what is ahead outside of the vehicle. One or more windows may be provided on the side of the vehicle/trailer.

FIG. 1 only illustrates one side of the vehicle/trailer of the present invention. In this particular embodiment a tow-bar 14 is located on this side.

Figure 2A:
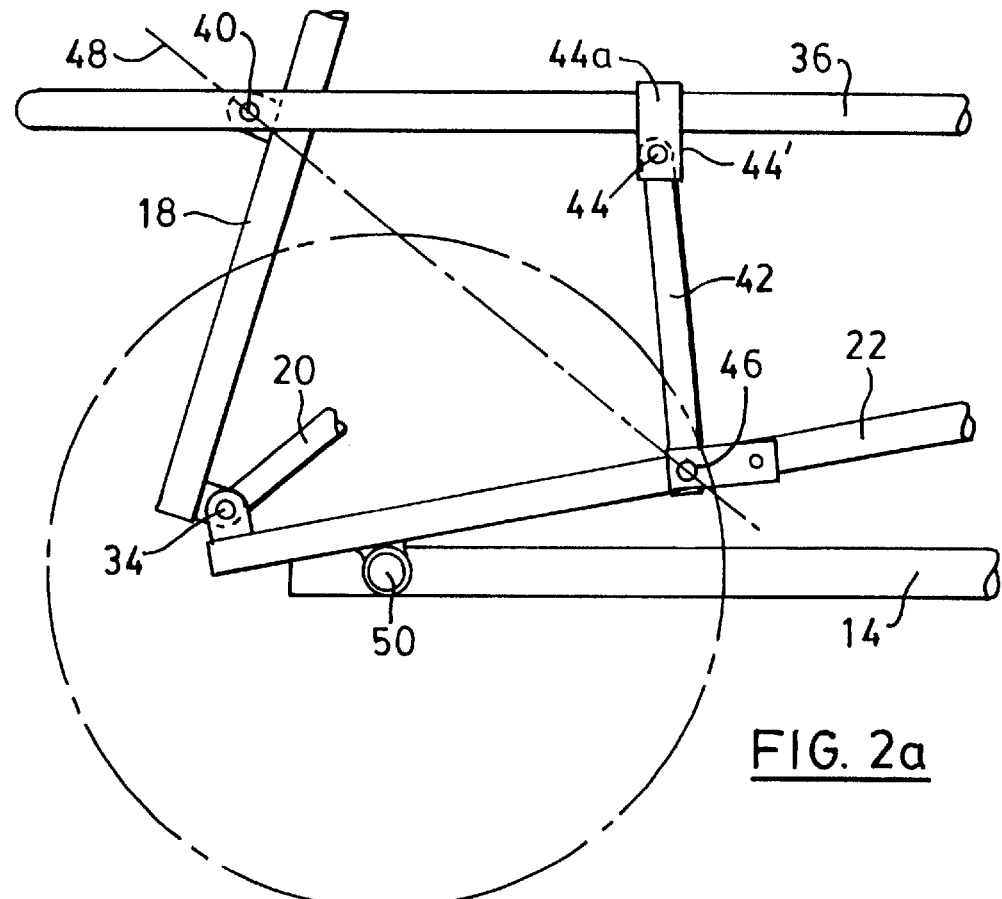
FIGS. 2a and 2b are schematic drawings of the basic folding mechanism for the folding frame of the present invention.

Turning to FIGS. 2a and b, a broader concept of the invention is illustrated schematically. Whereas FIG. 1 illustrates one specific embodiment of the present invention, FIGS. 2a and b illustrate a generalized folding mechanism used in the frame of the present invention. This aspect of the invention comprises four pivot points joining the chassis 22, the rear frame member 18, the release arm 36 and a hinge arm 42 together to comprise a folding mechanism for the frame of the vehicle of the present invention. The advantage of the folding mechanism of the present invention, as described in greater detail below, is that the vehicle/trailer can be easily collapsed typically in one motion and even using only one hand to close it.

Figure 2B:
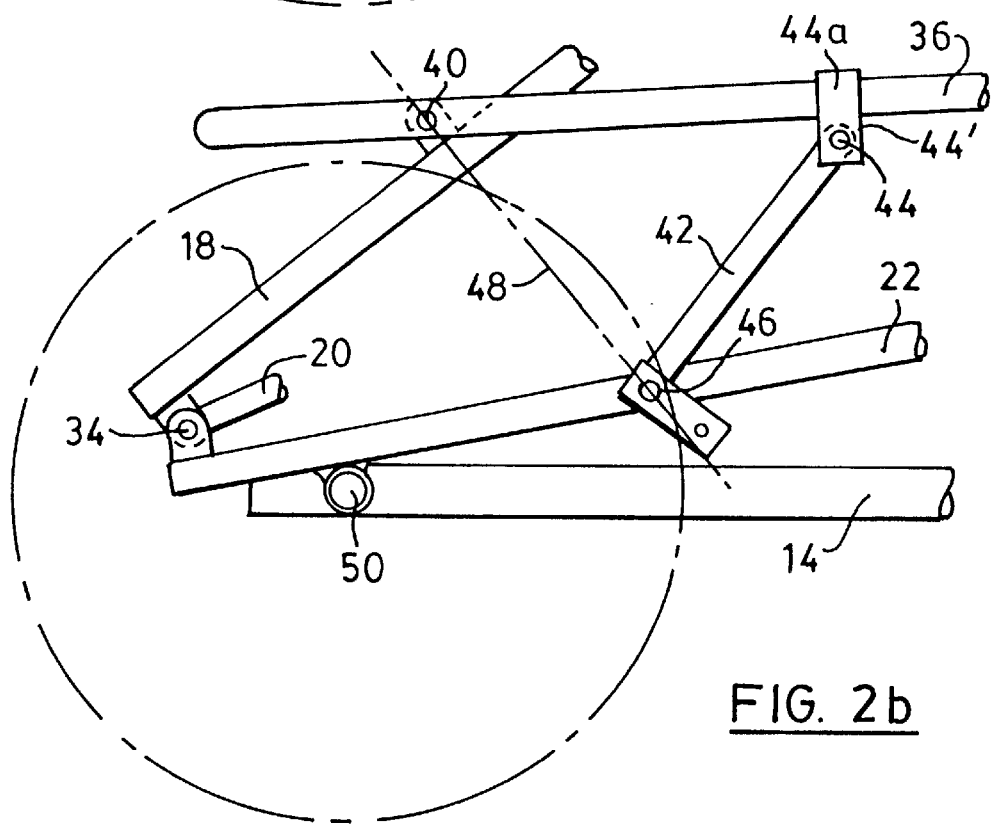
Figure 3A:
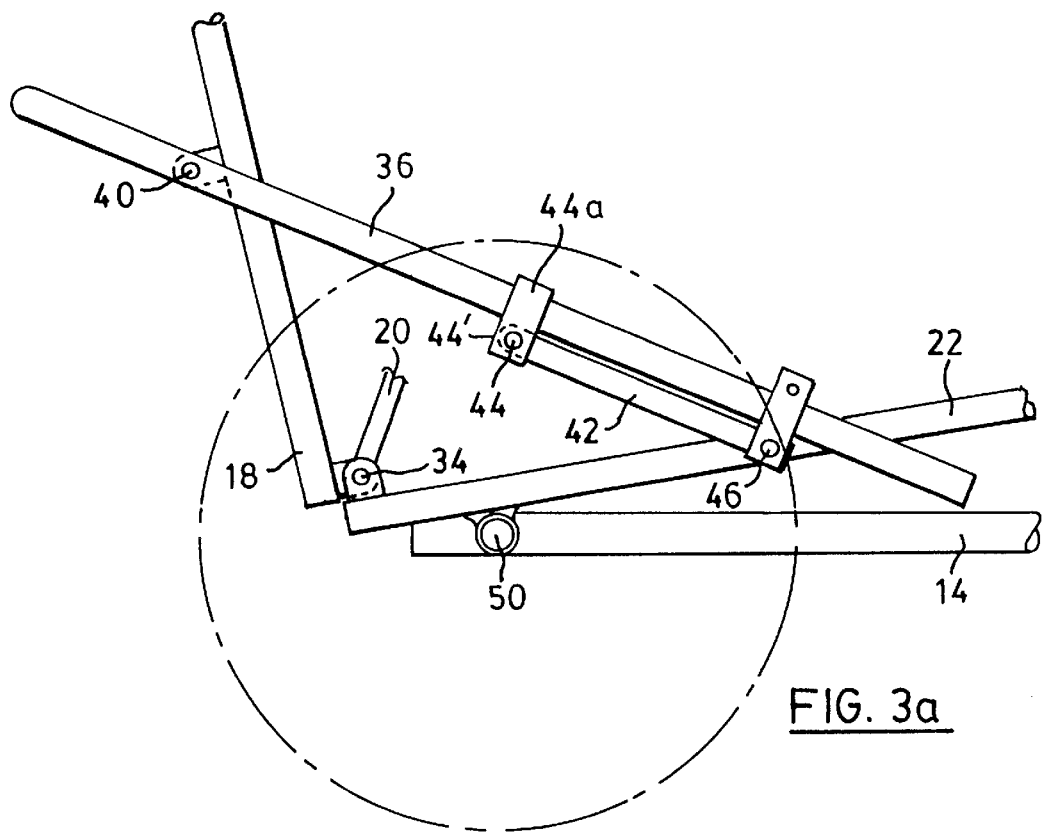
FIGS. 3a and 3b are schematic drawings of one embodiment of the present invention illustrating the basic frame components and their pivot points.
Figure 3B:
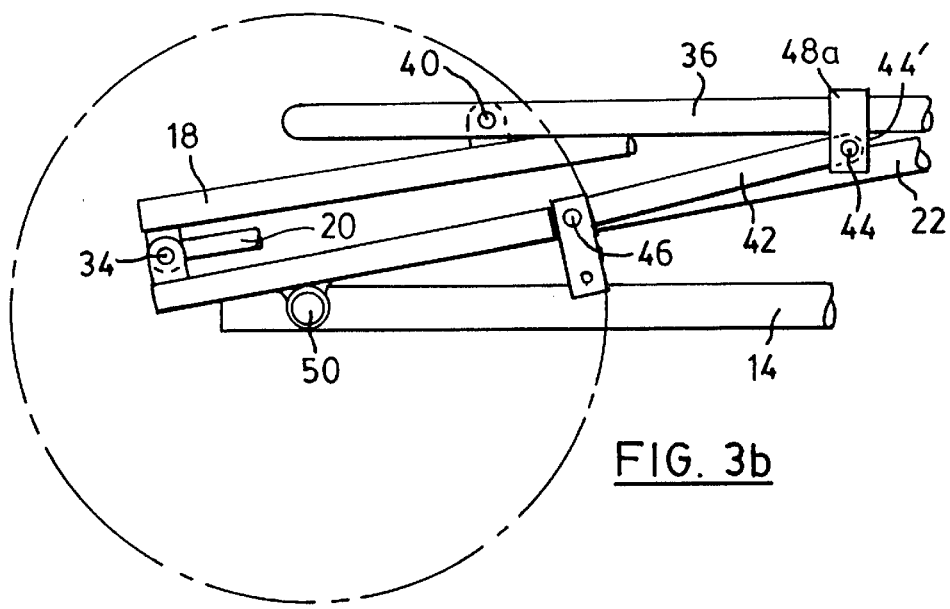

As illustrated in FIG. 2b the chassis 22 and a rear frame member 18 are connected at a first pivot point (34) referred to herein as the central pivot point. The term central pivot point is used only because in other embodiments other frame members may be pivoted from this same point. For example, as described elsewhere, a medial frame member 20 may also pivot from a central pivot point.

A release arm 36, having a handle end portion 38, is used to collapse and erect the vehicle/trailer. The release arm 36 has two pivot points 40, 44 located along its length. There is a rear pivot point 40 which joins the release arm 36 and the rear frame member 18. There is a also a pivot point 44 located at a distance between the rear frame member 18 and the handle end portion 38 of the release arm 36 which connects the release arm 36 to a hinge arm 42. Where the hinge arm 42 and the release arm 36 pivot the hinge arm may have an eye-end 44' which pivots via adjustable bracket 44a. The position of the adjustable bracket 44a on the release arm 36 controls the fully open angle between the frame 18 and the chassis 22.

The hinge arm 42 has two ends each of which pivot around part of the vehicle/trailer frame. As noted herein, in the preferred embodiment of the present invention, the hinge arm 42 is pivotally connected at one end to the release arm 36 at a point referred to herein as the release arm pivot point 44. The other end of the hinge arm 42 is pivotally connected to the chassis 22 at a point referred to herein as the chassis pivot point 46.

As illustrated in FIGS. 2a and 2b, as the handle end 38 of the release arm 36 is pulled forward, the hinge arm 42 pivots at the chassis pivot point 46 and moves over centre (the imaginary centre line 48 appears as a dotted line in FIGS. 2a and 2b between pivot points 40 and 46). At the same time the rear frame member 18 pivots on the central pivot point 34 and folds closed. Relative to the chassis 22, which can effectively remain substantially stationary during the opening and collapsing, the release arm 36 and the rear frame member 18 will fold closed one upon the other so that the frame members lie flat with one substantially atop the other, when in the closed position. This therefore permits easy storage and transport of the vehicle/trailer when in the fully closed position.

In a preferred embodiment of the present invention there are at least three frame members (including the chassis frame member 22) which together form the basic frame for the body of the vehicle/trailer. In this preferred embodiment the chassis 22, the rear frame member 18 and a medial frame member 20 form the three basic frame members for the body of the vehicle/trailer. The release arm 36 facilitates the opening and closing of this frame mechanism. Sometimes the release arm 36 may also be referred to herein as a frame member but does serve the additional function of opening and closing the folding vehicle/trailer.

The body of the vehicle/trailer may be made of a pliant or flexible fabric such as nylon, hemp or any other suitable fabric. When the frame moves from the open to the closed positions, and vice versa, the fabric body stretches and folds accordingly. The collapsed frame may be inserted into the fabric body through the front opening 32.

According to one aspect of the preferred embodiment of the present invention, the medial frame member 20 pivots only at the central pivot point 34 and otherwise is not connected to other elements of the frame or vehicle/trailer. In this version of the vehicle/trailer of the present invention, the medial frame member 20 moves freely, without constraint, when the vehicle/trailer frame is uncovered by fabric. The fabric, which forms the body of the vehicle/trailer, serves to secure the medial frame member 20 in an upright position by the cut and shape of the fabric when the fabric is secured over the three basic frame members 18, 20, 22.

Figure 4:
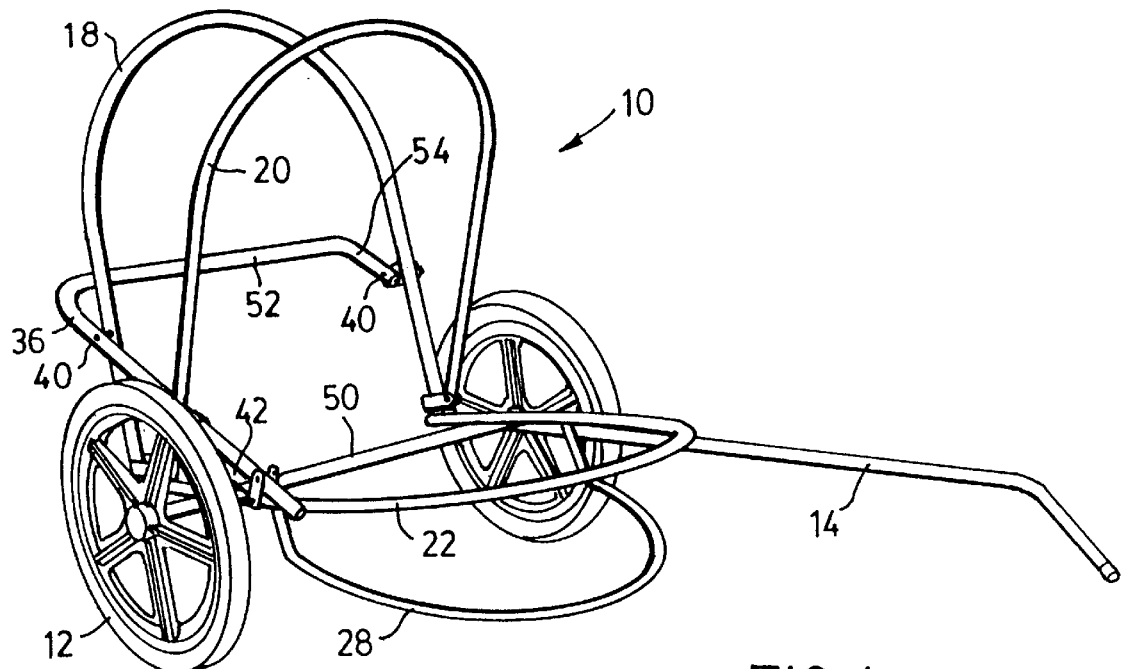
FIG. 4 is a perspective drawing of the frame without a cover, when in erected position ready for use.

FIG. 4 illustrates a preferred embodiment of the foldable frame of the present invention. The chassis 22 is hoop shaped and extends forwardly from the axle 50. A lower frame member 28 extends from the front of the chassis 22 to form a space which will serve as a space for the feet of the passenger(s). In this embodiment, the lower frame member 28 may also be suspended from the chassis 22 by a fabric strip 23.

In preferred embodiments of the invention, the three main frame members 18, 20 and 22 are hoop-shaped having first and second ends with the hoop extending in the middle. The first ends are pivotally connected at a central pivot point 34 on one side of the vehicle/trailer, in the preferred embodiment located just to the rear of the axle 50, and the second ends are similarly pivoted from a second central pivot point 34 on the opposite side of the vehicle/trailer.

The frame as illustrated in FIG. 4 is in its fully erect or open position. As seen in this figure, the release arm 36 extends as a longer portion along one side of the vehicle/trailer 10, extending around the back of the vehicle as a back portion 52 and partially forward along the opposite side in a shorter side portion 54. The shorter side portion 54 is also pivotally joined to the rear frame member 18 so that the rear frame member 18 pivots off the release arm 36 at two places. The handle end 38 of the release arm 36 extends forward of the release arm pivot point 44 where the release arm 36 is connected to the hinge arm 42 (shown only partially). The frame is mounted on an axle 50 between two wheels 12. The axle 50 is attached to the chassis 22 just forward of the central pivot point 34. As seen in FIG. 4, the rear frame member 18, when in the fully open position, preferably angles towards the back of the vehicle/trailer and the medial frame 20 preferably angles slightly forward. The release arm 36 generally angles forwardly and downwardly from its back bar 52, in a preferred embodiment. On the same side as the shorter side portion 54 of the release arm 36 is a tow-bar 14.

While the release arm 36 is shown in FIG. 4 as "one-piece", one skilled in the art would understand that it could be more than one piece welded or otherwise joined together so long as it pivots with the rear frame 18 as the handle end 38 is pulled forwards or backwards during folding or opening. The back bar 52 is not necessary to this movement but is a convenient place to hang a pocket or carrying bag.

Figure 5:
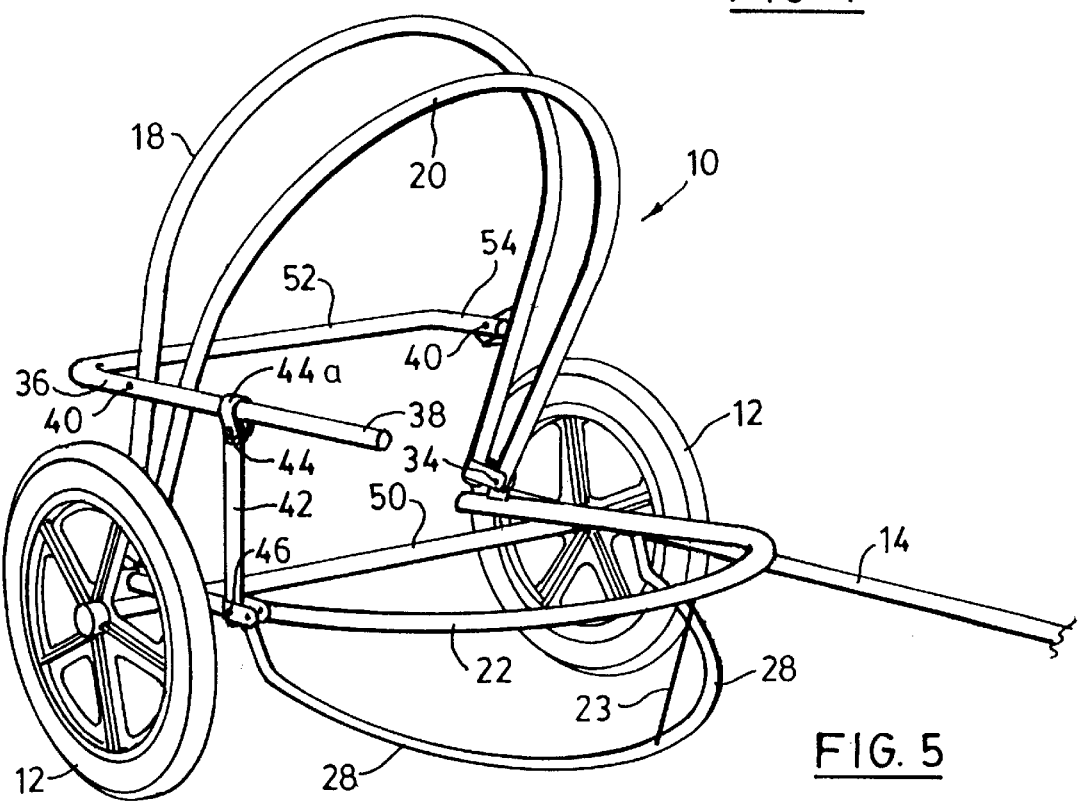
FIG. 5 is a perspective view of the frame without a cover with the hinge arm in the vertical position, illustrating the frame in a partially folded position.
Figure 6:
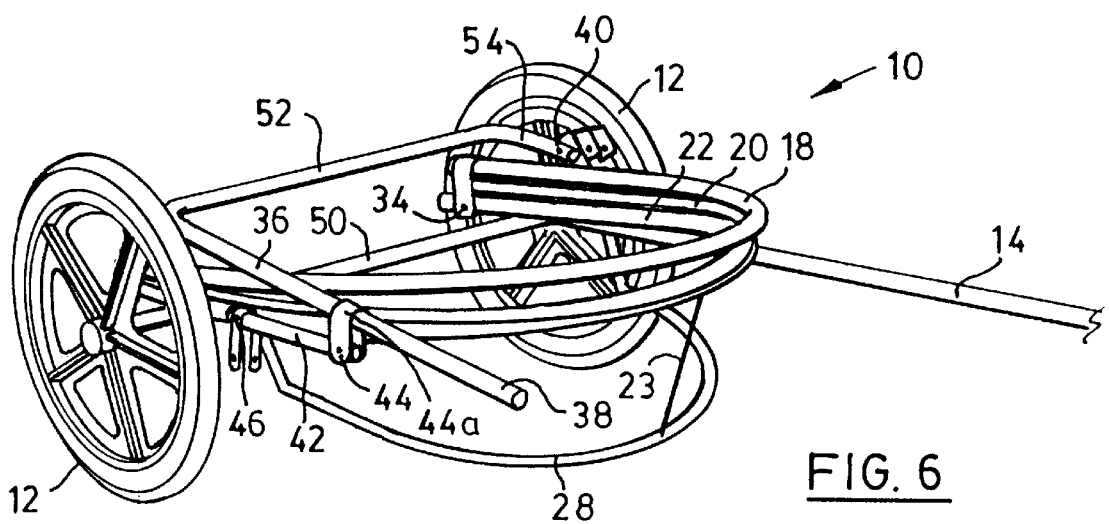
FIG. 6 is a perspective drawing of the frame in the collapsed or folded position.

The basic frame member positions are illustrated in FIGS. 4, 5 and 6 illustrating the fully open position, partially collapsed position and fully collapsed position, respectively.

FIG. 5 illustrates the same preferred embodiment as FIG. 4 except that the frame is in a partially collapsed position. The release arm pivot point 44 is formed by the eye-end 44' and the bracket 44a where the hinge arm 42 connects with the release arm 36 thereby allowing the angulation between the release arm 36 and the hinge arm 42 to change as the handle end portion 38 of the release arm 36 is pulled forward or pushed backwards for opening or folding the frame.

FIG. 6 illustrates the fully folded or collapsed position of the frame illustrated in FIGS. 4 and 5 (described above). In FIG. 6 the three basic frame members 18, 20 and 22 are all hoop shaped and fold to lie one on top of the other. The release arm 36 folds down as well and lies on top of the other frame members in this particular embodiment. One skilled in the art would know that the release arm could rest in other positions depending how it is joined to the frame members.

In the fully collapsed position the overall length of the frame is shorter than when in the fully erect position. This facilitates the transportation of the vehicle inside another vehicle and even allows it to be carried by the user from one location to another. For further ease of transport the tow-bar 14 can be designed to either fold at one end or be detachable from the frame.

FIGS. 7, 7A, 8, 9, 10, and 11 illustrate various views of a preferred embodiment of the trailer version of the present invention covered in a pliant fabric. In most respects, the trailer embodiment is substantially similar to the vehicle version illustrated in FIG. 12.

Figure 7:
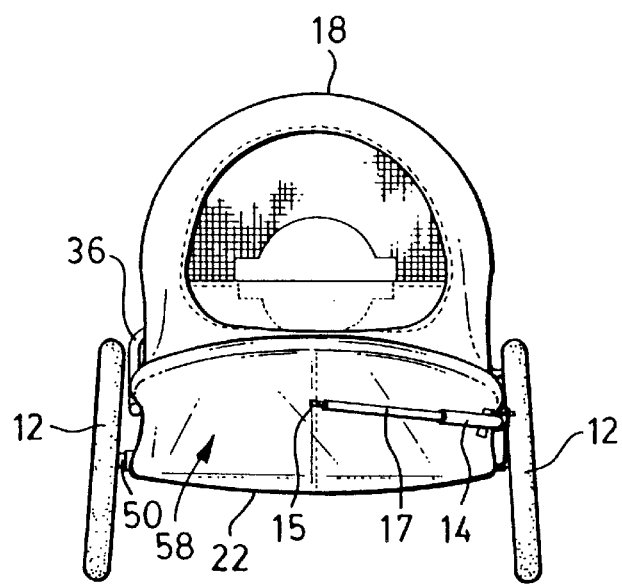
FIG. 7 is a front elevational view of a trailer embodiment of the present invention.
Figure 7A:
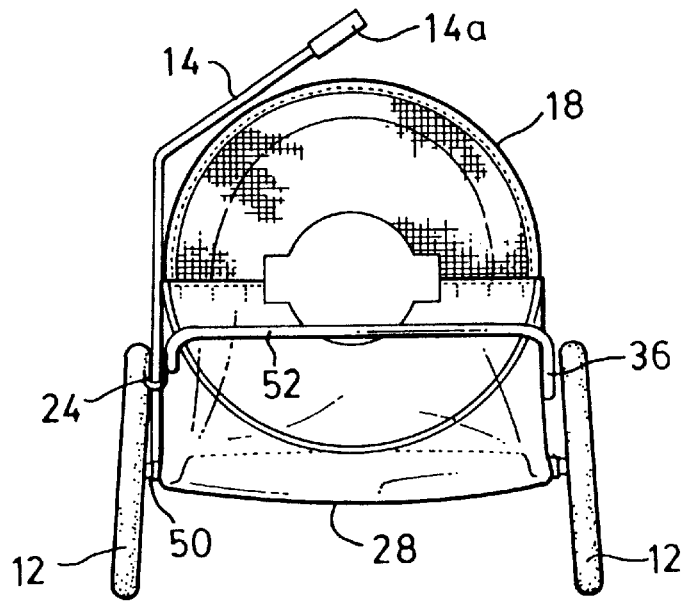
FIG. 7A is a rear elevational view of a trailer embodiment of the present invention.

FIG. 7A illustrates a rear elevational view of the trailer. Although not an essential feature, this particular embodiment has a window in the rear of the trailer. The window can be meshed or clear plastic. Other suitable window coverings would clearly be known to a person skilled in the art and are contemplated by the present invention.

Although this embodiment illustrates a trailer, the rear elevation view would not be substantially different if this were another type of vehicle. In FIG. 7A the back bar 52 of the release arm 36 serves as the support bar for a rear pouch, carrying bag, or in the case of a vehicle, a small trunk for carrying items. The release arm 36 is also seen in this view and, on the other side, the tow-bar 14 extends behind the trailer and rests on tow-bar rest 24 (seen in FIG. 1), illustrating an embodiment where the handle portion 17 of the tow bar 14 is angled to allow the vehicle/trailer to be pushed.

Note that the tow-bar catchment is on the left hand side of FIG. 7A whereas the tow-bar is illustrated on the right hand side of FIG. 7. Generally the tow-bar 14 and the portion of the release arm 36 ending in the handle end portion 38 are on opposite sides of the vehicle for easier use. This particular arrangement, however, is a matter of convenience and it does not affect the operation of the present invention if the handle side of the release arm 36 and the tow-bar 14 are mounted on the same side of the vehicle, but makes its use more awkward.

Figure 8:
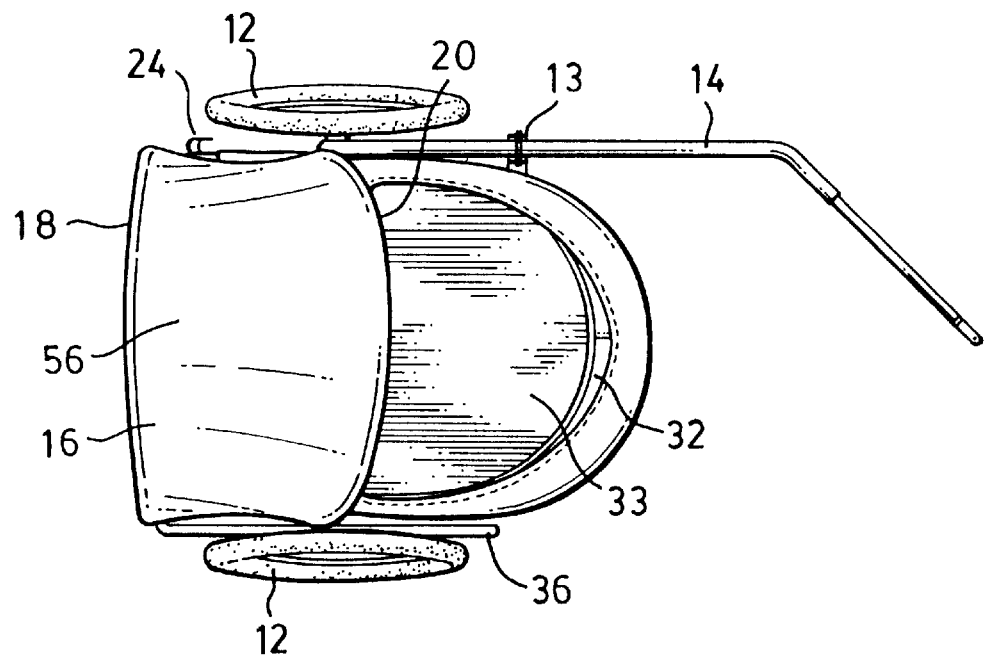
FIG. 8 is a top plan view of a trailer embodiment of the present invention.

FIG. 8 is a top plan view of the trailer embodiment of the present invention in the fully erect/open position. A roof portion 56 of the vehicle/trailer body is seen in this view and is formed by the fabric 16 as it stretches between the top of the medial frame member 20 and the top of the rear frame member 18. In this particular drawing of the invention the opening 32 has a cover 33. The cover could be clear plastic, mesh, or other suitable covering. The cover can be secured over the opening either by snaps, zippers, Velcro or other suitable securing means. These and other suitable variations, modifications and equivalents would be well understood by a person skilled in the art.

Figure 9:
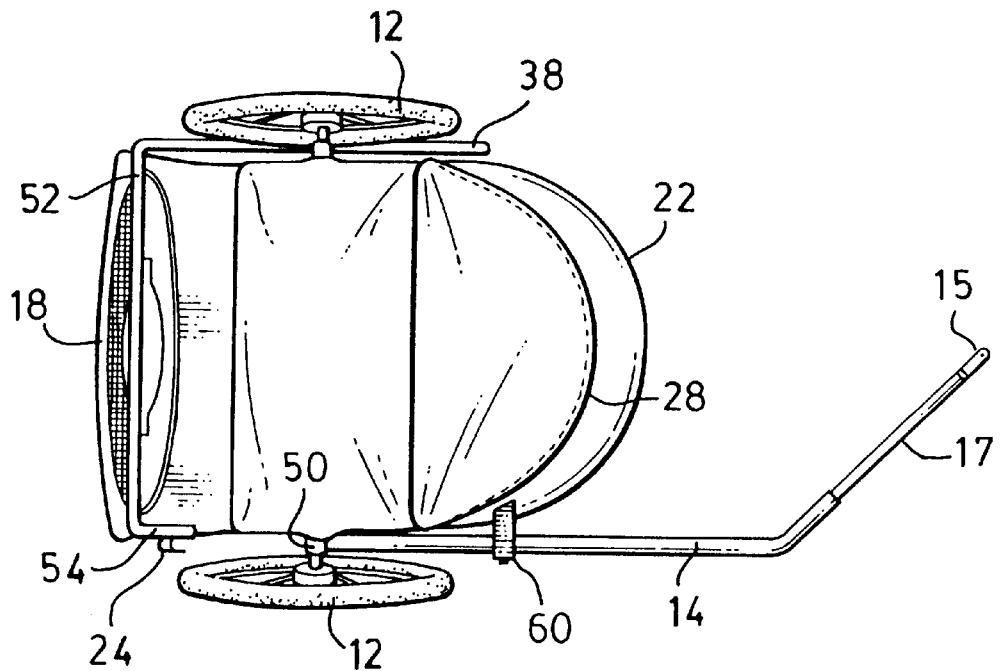
FIG. 9 is a bottom plan view of a trailer embodiment of the present invention.

FIG. 9 is a bottom plan view of the trailer embodiment of the present invention. Again the vehicle embodiment would be similar but have additional wheels and would not include the tow-bar 14. In this view support 60 of the catchment 11 for the tow-bar 14 to rest on is visible. Again, for convenience, the tow-bar 14 and the longer portion of the release arm 36 with handle end portion 38 are on shown on opposite sides of the trailer. In this view one can see how the leading front edge of chassis 22 extends in front of the leading front edge of the lower frame portion 28 to create a suitable foot space 30 for the passenger(s).

Figure 10:
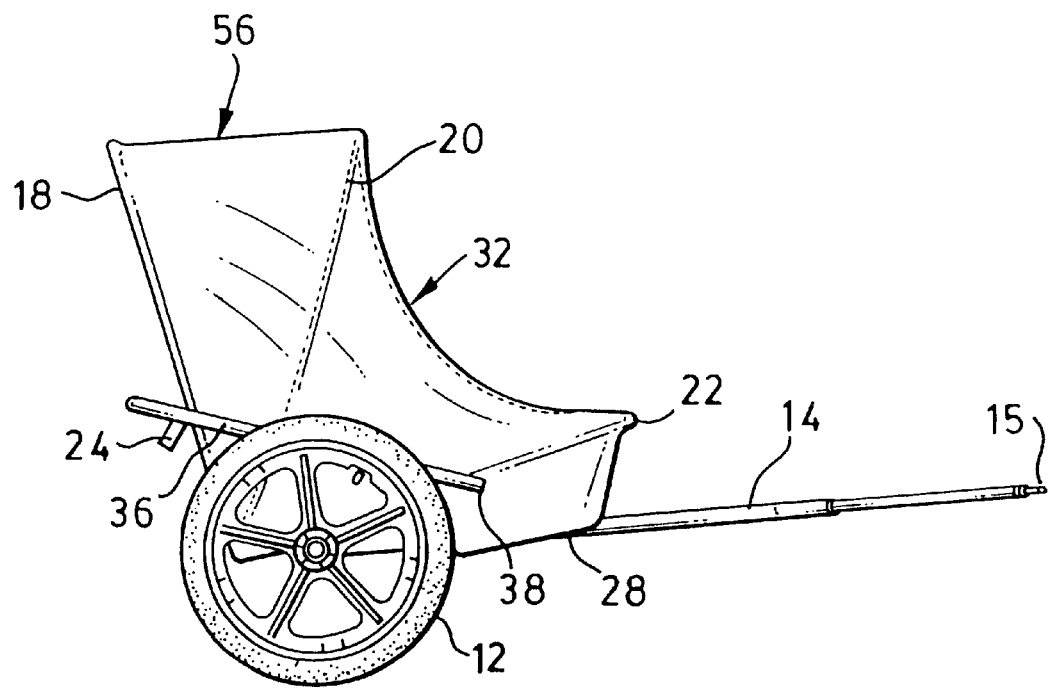
FIG. 10 is a side elevational view of a trailer embodiment of the present invention illustrating the release arm side of the trailer.

FIG. 10 is a side elevation view from the side on which the longer portion of the release arm 36, with handle end 38, is mounted. No new features are shown this Figure but again it illustrates the relationship between the chassis 22 and the lower frame 28 to create the foot space 30 for one or more passengers. The preferred forward and downwards slant of the release bar 36 is also seen in this view.

Figure 11:
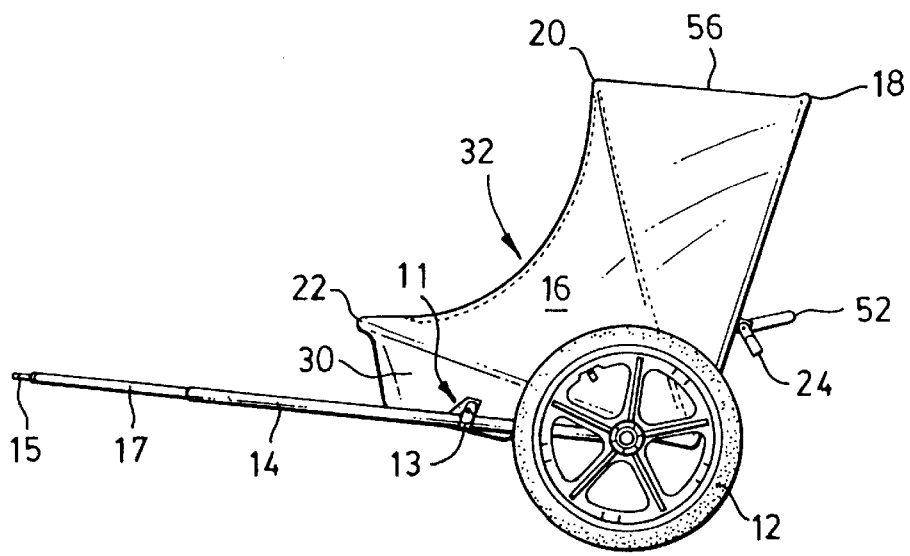
FIG. 11 is a side elevational view of a trailer embodiment of the present invention illustrating the tow-bar side of the trailer.

FIG. 11 is a side elevation view from the other side of the trailer. As noted previously, in this particular embodiment the tow-bar 14 is mounted on this side. The pin 13 used to secure the tow-bar 14 in place in catchment 11 can be seen in this view. The tow-bar 14 can be released from the catchment 11 (first tow-bar position) by the removal of pin 13 and pivoted backwards to rest, if desired, in tow-bar rest 24 (second tow-bar position). In this second position the tow-bar 14 can be used as a handle for pushing the trailer or vehicle. The front portion 17 of the tow-bar 14 is angled to provide the necessary handle means for pushing and to space the tow-bar 14 from the rear wheel of a bicycle so that the bicycle can manoeuvre without contacting the tow-bar 14.

Figure 12:
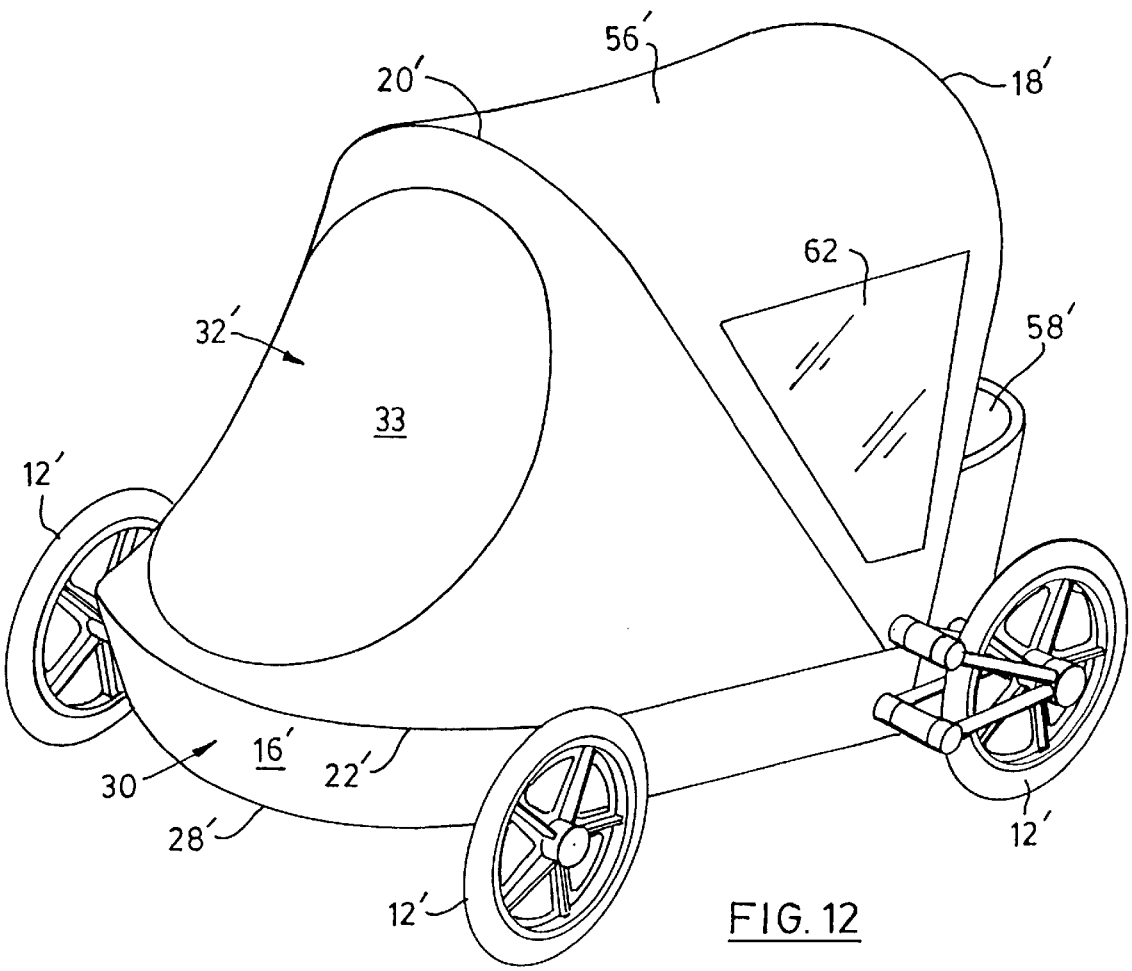
FIG. 12 is a perspective view of an embodiment of the present invention illustrated as a self-contained vehicle.

FIG. 12 illustrates a different embodiment of the present invention. Rather than the trailer embodiment of the previously described figures, FIG. 12 illustrates a vehicle embodiment. The vehicle could be either motorized or passenger powered. It would have steering means (not shown). Generally, the front wheels 12' would steer the vehicle In this embodiment there are two rear wheels 12' and two front wheels 12'. It is possible that this could also be constructed as a three-wheeled vehicle as well.

The overall structure is substantially the same as the trailer embodiment described above having a rear frame member 18', a medial frame member 20' and a chassis 22'. There is a footwell 30 formed by the fabric 16' extending around the chassis frame portion 22' and over the lower frame portion 28'. There is a roof portion 56' and a trunk area 58'. Passengers would enter the vehicle from the front opening 32' and this opening could be covered by a suitable fabric, mesh screen, plastic or other suitable clear material 33. Generally a plastic material would be used to protect the passenger from any inclement weather. A window 62 may be provided in the side of the vehicle.

The folding vehicle illustrated in FIG. 12 could be either human powered or motorized. It is lightweight and can be folded for carrying or transporting as required. This version would be larger in size than the trailer version described herein as it would likely be used by one or more adult(s) rather than a child or children. The foldable vehicle of the present invention could be folded into its compact shape and then easily placed by hand inside another vehicle such as a train, car, bus or van. This vehicle would be best suited to local personal commuter trips.

The foldable vehicle or trailer of the present invention could readily be stored in one's apartment and the trailer version could possible be stored under a bed. The foldable vehicle would reduce the need for street parking as it could be folded and locked to a bicycle stand or a parking meter similar to the way a bicycle would be locked.

In use, to fold or collapse the vehicle/trailer of the present invention the handle end 38 of release arm 36 is pulled forward. This then causes the hinge arm 42 to swing forward over centre. At the same time the rear frame member 18 which is pivotally connected to the release arm 36 also moves forward. Since both the rear frame member 18 and the medial frame member 20 are pivotally connected at the central pivot point, as rear frame member 18 moves forward so does medial frame member 20. Once the hinge arm 42 has fully pivoted forward the rear frame member 18 and the medial frame member 20 will have also pivoted fully forward to lay substantially flat over the chassis 22. The pliant, flexible fabric 16 folds as the frame folds. A pocket at the rear of the vehicle would generally fold inward. In this embodiment, the release arm 36 comes to rest on top of the other frame members, although other positions are clearly possible and would be known to a person skilled in the art.

A person skilled in the art would know that the length of the binge arm 42, the release arm 36 and the dimensions of the other frame members 18, 20 and 22 will have to be adjusted so that the frame members open and close with ease and lie substantially flat in the fully closed position. A clear advantage of the present closing mechanism is the fact that the whole vehicle/trailer will fold/collapse in one movement. Furthermore, in the closed position the frame length from rear to front is now shorter than when it is in the open position which is also advantageous.

When opening the folding vehicle/trailer 10 of the present invention the handle end 38 of release arm 36 is moved upwards and backwards to open up the frame members. The hinge arm 42 moves back and passes over centre line 48 until it reaches its full extension at which point the rear frame member 18 (which is pivotally connected to release arm 36) is pushed all the way back. Medial member 20 is captured by the fabric and lifts upwards with the fabric and can be adjusted to its open or unfolded position where it is secured by the tension of the fabric over it.

Modifications, variations and alterations to the folding frame for a trailer or a moving vehicle according to the present invention are contemplated and fall within the scope of the invention as claimed in the accompanying claims.

Although various preferred embodiments of the present invention have been described herein in detail, it will be appreciated by those skilled in the art, that variations may be made thereto without departing from the spirit of the invention or the scope of the appended claims.

I claim:

1. A foldable frame for a vehicle comprising:
   a) a chassis,
   b) at least one frame member pivotally mounted to said chassis at a first pivot point adjacent to its rear end,
   c) a hinge arm pivotally mounted to said chassis at a second pivot point spaced from said first pivot along said chassis, and
   d) a release arm pivotally mounted to said at least one frame member at a third pivot point and pivotally mounted to said hinge arm at a fourth pivot point, wherein as the frame is unfolded the fourth pivot point moves toward a line defined between said second pivot point and said third pivot point to increase a leverage provided by said release arm as the frame approaches a fully open condition.

2. The frame according to claim 1 wherein said at least one frame member further comprises a rear frame member and a medial frame member.

3. The frame according to claim 2 wherein said release arm and said medial frame member are not connected together such that said medial frame member is free to move around said first pivot point at which said rear frame member, said medial frame member and said chassis are together pivotally connected.

4. The frame according to claim 3 provided with a pliant fabric surrounding said rear frame member, said medial frame member and said chassis thereby forming a body portion and when in said open position said medial frame member is kept in the open position by a shape and cut of said pliant fabric.

5. The frame according to claim 4 wherein said chassis further comprises a lower frame member extending below said chassis which when covered by said fabric forms a well below said chassis.

6. The frame according to claim 5 wherein said body portion is mounted on an axle with wheels.

7. The frame according to claim 6 further comprising a tow-bar.

8. The frame according to claim 7 wherein said tow-bar is pivotally connected proximate to said axle.

9. The frame according to claim 8 wherein said tow-bar can be pivoted between an upper position and a lower position such that when in said upper position the vehicle can be pushed and when in said lower position the vehicle can be towed or pulled.

10. The frame according to claim 9 wherein said tow-bar is secured in either said upper position or in said lower position.

11. The frame according to claim 10 wherein rotation of said tow-bar is limited in said upper position by a catchment.

12. The frame according to claim 11 wherein rotation of said tow-bar is limited in said lower position by a catchment.

13. The frame according to claim 6 wherein said body is mounted on at least three wheels such that at least one wheel is positioned at the front of the vehicle and the other two wheels are secured to said axle at the rear of said vehicle.

14. The frame according to claim 13 further comprising a motor to drive said wheels.

15. The frame according to claim 4 wherein said rear frame member, said medial frame member and said chassis are hoops, said hoops having a first end and a second end, said hoops being pivotally mounted at said first pivot point proximate said first ends and said hoops being pivotally mounted to said axle at said second ends.

16. The frame according to claim 15 wherein said chassis is permanently mounted on said axle and said rear frame member and said medial frame member are free to pivot at said first pivot point.

17. The frame according to claim 15 wherein said release arm extends behind said rear frame member and said release arm having a first handle end and a second distal end is pivotally connected to said rear frame member at a second pivot point on said rear frame member at said distal end of said release arm.

18. The frame according to claim 17 wherein said release arm is external to said fabric.

19. The frame according to claim 18 wherein the portion of said release arm extending behind said rear frame member further comprises a support frame for a sac for carrying goods.

20. The frame according to claim 1, in which the fourth pivot point passes the line defined between said second pivot point and said third pivot point before the frame reaches the fully open condition.

* * * * *

UNITED STATES PATENT AND TRADEMARK OFFICE
CERTIFICATE OF CORRECTION

PATENT NO. : 5,921,571
DATED : July 13, 1999
INVENTOR(S) : Robert Bell

It is certified that error appears in the above-identified patent and that said Letters Patent is hereby corrected as shown below:

Column 10, line 10, delete -- to increase--

Signed and Sealed this

Twenty-eighth Day of December, 1999

Attest:

Q. TODD DICKINSON

*Attesting Officer*    *Acting Commissioner of Patents and Trademarks*